June 19, 1956

M. B. HEFTLER 2,751,201

COASTING ECONOMIZERS

Filed May 24, 1952

Maurice Ben Heftler

INVENTOR.

United States Patent Office 2,751,201
Patented June 19, 1956

2,751,201
COASTING ECONOMIZERS

Maurice Ben Heftler, Grosse Pointe Park, Mich.

Application May 24, 1952, Serial No. 289,753

2 Claims. (Cl. 261—41)

In many applications of internal combustion engines, it is desirable to shut off the fuel delivered by the carburetor when the engine is coasting in order to avoid the poor combustion that occurs when fuel is supplied during coasting.

Coasting is a condition of engine operation during which the speed of the engine is greater than it would maintain if it were disconnected from its load. It occurs whenever the throttle is closed from a speed in excess of the idle speed, usually coincident with deceleration. It may also occur when the vehicle goes down a steep grade, and it may then be associated with acceleration. During coasting the engine is absorbing power, either from its connected load or from its own inertia, or from both, and it is operating with an intake manifold vacuum that is higher than it would be if it were delivering energy at the same speed. This abnormally high manifold vacuum increases the dilution of the incoming carbureted fuel by the exhaust products trapped in the cylinders at the end of each exhaust stroke. The diluted charge does not burn completely in the cylinders. The partially burned fuel has a bad odor, and it may, under certain conditions, be ignited in the muffler.

The abnormally high manifold vacuum that occurs when the engine is coasting may be used to actuate a valve to close the idle fuel passage. Such a valve has to be adjusted to close the fuel passage only when the manifold vacuum is greater than it is under any condition of power delivery. It is well known that the maximum manifold vacuum at zero engine load occurs at a speed considerably above idle speed, and that this maximum vacuum may be some 20% greater than the vacuum at idle. A valve controlled only by manifold vacuum does not respond to small degrees of coasting except in the speed range that gives maximum no load manifold vacuum because a small increment of speed above the no load speed for a given throttle position develops only a small increment of manifold vacuum above the no load manifold vacuum. Such a valve is not sufficiently responsive for most applications. It fails to respond under many conditions where it is desired to shut off the fuel to avoid odors or afterburning.

In this invention, I apply the vacuum in the idle emulsion channel over a portion of a diaphragm, on the opposite side from which is applied the manifold vacuum, to oppose the manifold vacuum and thereby gain tremendously in sensitivity, making it possible to adjust the diaphragm to operate on speed differences as low as 100 R. P. M. at all speeds of the engine up to about three times idle speed. Whereas manifold vacuum at no load increases some 20% from 400 R. P. M. to 1200 R. P. M., the vacuum in the idle emulsion channel may increase some 500%. By suitable design of areas it is not difficult to select a combination of these two vacuums that is substantially constant for all no load speeds up to about 1200 R. P. M., and to use this combination to actuate a diaphragm. It makes a sensitive system because this combination rapidly exceeds into no load value for even small degrees of coasting.

Figure 1:
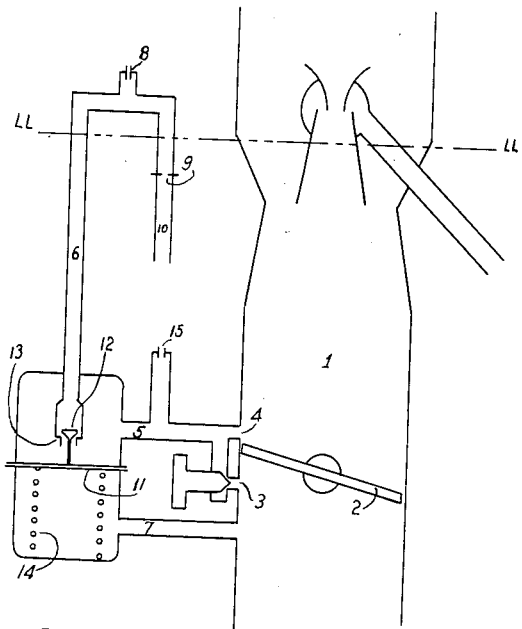
Figure 1 shows a form of this invention in which the idle port vacuum is applied over the entire diaphragm area at all times.

In the drawings, the throttle bore 1 of a downdraft carburetor is shown nearly closed by the throttle plate 2 in the idle position. A high vacuum exists below the throttle plate and this vacuum is transmitted through the lower priming hole 3, reduced by air admitted by the upper priming hole 4, conveyed through the portions 5 and 6 of the idle emulsion channel, further reduced by the anti-siphon air bleed 8, and finally applied to the idle fuel jet 9 to draw fuel through the idle fuel channel 10 from below the liquid level LL. Channel 7 conveys manifold vacuum to the diaphragm 11 which is urged to hold the valve 12, rigidly connected to the diaphragm, off the seat 13 by the spring 14.

With the arrangement of parts shown in Figure 1 the vacuum in the upper portion 6 of the idle channel will drop to zero when the valve 12 closes and fuel will stop flowing to the ports 3 and 4. The vacuum in the lower portion 5 of the idle channel will rise when the valve closes. This increase in vacuum will tend to open the valve and fluttering may result. In some carburetors, depending on the sizes selected for the various orifices in the idle system, it may be found advisable to add an additional air bleed 15 to admit air to channel 5, and thus limit the increase in idle system vacuum caused by closing valve 12 and thereby reduce the tendency to flutter to tolerable limits.

Figure 2:
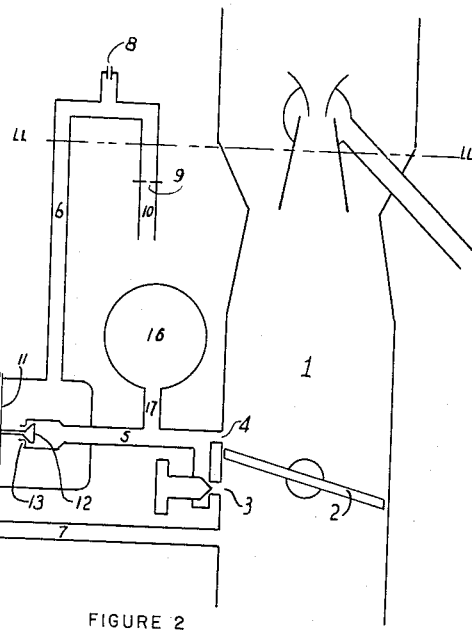
Figure 2 shows a form of this invention in which the idle port vacuum is applied over the entire diaphragm area only when the valve is open.

With the arrangement of parts shown in Figure 2 the vacuum in the upper portion 6 of the idle channel will drop to zero when the valve 12 closes and fuel will stop flowing to the ports 3 and 4. The vacuum in the lower portion 5 of the idle channel will rise when the valve closes, but this will not affect the diaphragm. The drop in vacuum in the upper portion will cause the diaphragm to increase the pressure holding the valve closed and this will require a somewhat lower manifold vacuum, transmitted through channel 7, to allow the valve to open than is required to close the valve.

When coasting is terminated the diaphragm opens the valve and the vacuum in channel 5 begins to draw fuel through the jet 9. Since channel 6 may be of considerable length in some downdraft carburetors enough time may elapse before fuel is delivered through the ports 3 and 4 to allow the engine to stall. It may then be advisable to add a vacuum accumulator 16 connected to channel 5 by channel 17 to accelerate the resumption of fuel delivery. When the valve is closed a high vacuum will exist in the accumulator. When the valve opens this vacuum will be relieved by air from channel 6. The high vacuum in the accumulator will draw the air out of channel 6 more rapidly than will the suction applied on ports 3 and 4 alone. Any fuel that goes into the accumulator with the air will soon drain out by gravity into channel 5.

Figure 3:
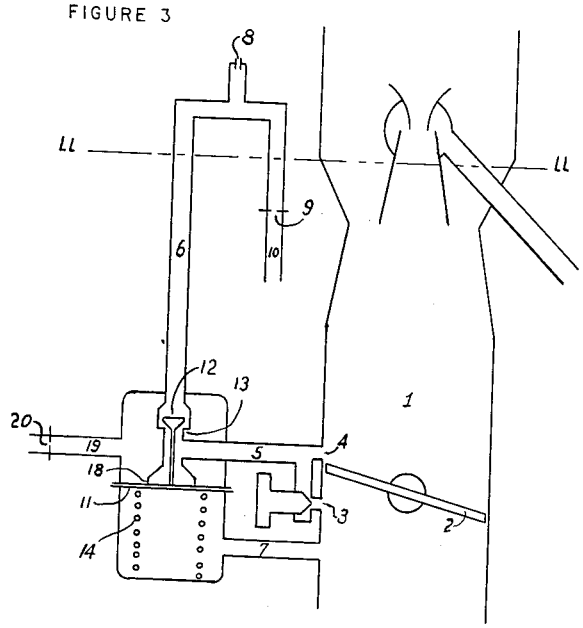
Figure 3 shows a form of this invention in which the idle port vacuum is applied over a portion of the diaphragm area when the valve is closed and a modified idle port vacuum is applied over the entire diaphragm area when the valve is open.

With the arrangement of parts shown in Figure 3, the vacuum in the upper portion 6 of the idle channel will drop to zero when the valve 12 closes and fuel will stop flowing to the ports 3 and 4. The vacuum in the lower portion 5 of the idle channel will drop when the valve 12 closes but the force of that vacuum on the diaphragm will be virtually the same with the valve 12 closed as with it open. It should be noted that channel 5 does not communicate directly with the diaphragm chamber as in Figure 1. It communicates with the extension of channel 6 below the seat 13. Channel 6 is further enlarged to form seat 18 which is sealed off by the diaphragm 11 when valve 12 is open. The space within the diaphragm chamber is vented to the atmosphere by channel 19 having a restriction 20. The size of the seat 18 should be selected so that the increase in vacuum in channel 5, as the engine speed is increased by opening the throttle slowly, without load on the engine, applied to the area of the diaphragm within the seat, is just sufficient to counterbalance the increase in manifold vacuum, applied through channel 7 to the entire area of the diaphragm. It is usually possible to achieve a good balance for speeds up to three times the idle speed. The size of the restriction 20 should be selected so that the vacuum in channel 5 is reduced by just the right amount to compensate for the increased diaphragm area on which it acts when valve 12 closes.

When the valve 12 is fully open the seat 18 is sealed by the diaphragm. As the valve begins to move, air is admitted, from the atmosphere through restriction 20, thus reducing the vacuum in channel 5 and causing a reduction in fuel flow through jet 9. When the diaphragm 11 and valve 12 are at mid-stroke air is being supplied to channel 5 through both restriction 20 and air bleed 8, and the vacuum in channel 5 is less than with the valve at either end of its stroke. This momentary drop in vacuum accelerates the travel of the valve toward closed position.

I claim:

1. In a carburetor with a constant level fuel chamber, an air passage and a throttle in said air passage; a fuel channel leading from the fuel chamber upward to a point above the fuel level and thence to a port in said air passage between the throttle and the engine; a valve to close said fuel channel, said valve being actuated by a diaphragm with a spring to urge the valve to open, one side of the diaphragm being exposed to the vacuum existing in the air passage between the throttle and the engine and a portion of the other side of the diaphragm being continuously exposed to the vacuum existing in said fuel channel between the valve and said port; a connection between atmosphere and the said portion of the other side of the diaphragm; a second valve actuated by said diaphragm and controlling opening and closing of said connection to atmosphere, said last mentioned valve being closed when the first mentioned valve is open and being open when the first mentioned valve is closed.

2. In a carburetor with a constant level fuel chamber, an air passage and a throttle in said air passage; a fuel channel leading from the fuel chamber upward to a point above the fuel level and thence to a port in said air passage between the throttle and the engine; a valve to close said fuel channel, said valve being actuated by a diaphragm with a spring to urge the valve to open, one side of the diaphragm being exposed to the vacuum existing in the air passage between the throttle and the engine and a portion of the other side of the diaphragm being continuously exposed to the vacuum existing in said fuel channel between the valve and said port; a connection between atmosphere and the said portion of the other side of the diaphragm; a second valve actuated by said diaphragm and controlling opening and closing of said connection to atmosphere, said last mentioned valve being closed when the first mentioned valve is open and being open when the first mentioned valve is closed, and a restriction in said connection to atmosphere.

References Cited in the file of this patent

UNITED STATES PATENTS

| | | |
|---|---|---|
| 1,956,992 | Mallory | May 1, 1934 |
| 2,212,936 | Hoof | Aug. 27, 1940 |
| 2,315,715 | Leibing | Apr. 6, 1943 |
| 2,556,405 | Troy | June 12, 1951 |
| 2,657,913 | Raymor | Nov. 3, 1953 |

FOREIGN PATENTS

| | | |
|---|---|---|
| 388,987 | Great Britain | Mar. 9, 1933 |